US011675490B2

(12) United States Patent
Ariga

(10) Patent No.: US 11,675,490 B2
(45) Date of Patent: Jun. 13, 2023

(54) MANAGEMENT SYSTEM, MANAGEMENT METHOD, AND COMPUTER-READABLE MEDIUM

(71) Applicant: EVIDENT CORPORATION, Nagano (JP)

(72) Inventor: Naohiro Ariga, Tokyo (JP)

(73) Assignee: Evident Corporation, Nagano (JP)

( * ) Notice: Subject to any disclaimer, the term of this patent is extended or adjusted under 35 U.S.C. 154(b) by 0 days.

(21) Appl. No.: 17/502,268

(22) Filed: Oct. 15, 2021

(65) Prior Publication Data

US 2022/0137804 A1 May 5, 2022

(30) Foreign Application Priority Data

Oct. 30, 2020 (JP) .............................. JP2020-182792

(51) Int. Cl.
*G06F 3/04847* (2022.01)
*G02B 21/36* (2006.01)
*H04N 23/62* (2023.01)

(52) U.S. Cl.
CPC ....... *G06F 3/04847* (2013.01); *G02B 21/365* (2013.01); *G02B 21/36* (2013.01); *H04N 23/62* (2023.01)

(58) Field of Classification Search
CPC . G06F 3/04847; G06F 3/0481; G02B 21/365; G02B 21/36; H04N 5/23216
See application file for complete search history.

(56) References Cited

U.S. PATENT DOCUMENTS

| | | | |
|---|---|---|---|
| 2008/0246839 A1 | 10/2008 | Hattori et al. | |
| 2013/0070075 A1* | 3/2013 | Kakemizu | G02B 21/365 |
| | | | 348/79 |
| 2015/0130923 A1 | 5/2015 | Kobayashi et al. | |
| 2018/0173852 A1* | 6/2018 | Lou | A61B 6/032 |
| 2019/0289078 A1 | 9/2019 | Watanabe et al. | |
| 2022/0311933 A1* | 9/2022 | Fabris | G02B 21/365 |

FOREIGN PATENT DOCUMENTS

| | | |
|---|---|---|
| JP | 4996312 B2 | 8/2012 |
| JP | 2015-094855 A | 5/2015 |
| JP | 2019-159164 A | 9/2019 |

* cited by examiner

*Primary Examiner* — John R Schnurr
(74) *Attorney, Agent, or Firm* — Scully, Scott, Murphy & Presser, P.C.

(57) ABSTRACT

A management system for managing setting information of an observation system includes: one or more non-transitory computer-readable media that include an instruction; and one or more processors that execute the instruction. The instruction is configured to cause the one or more processors to perform an operation. The operation includes detecting a use status of a setting indicated by the setting information, and updating, in accordance with the detected use status, evaluation information indicating an evaluation pertaining to the setting, the evaluation information being managed so as to be associated with the setting information.

14 Claims, 26 Drawing Sheets

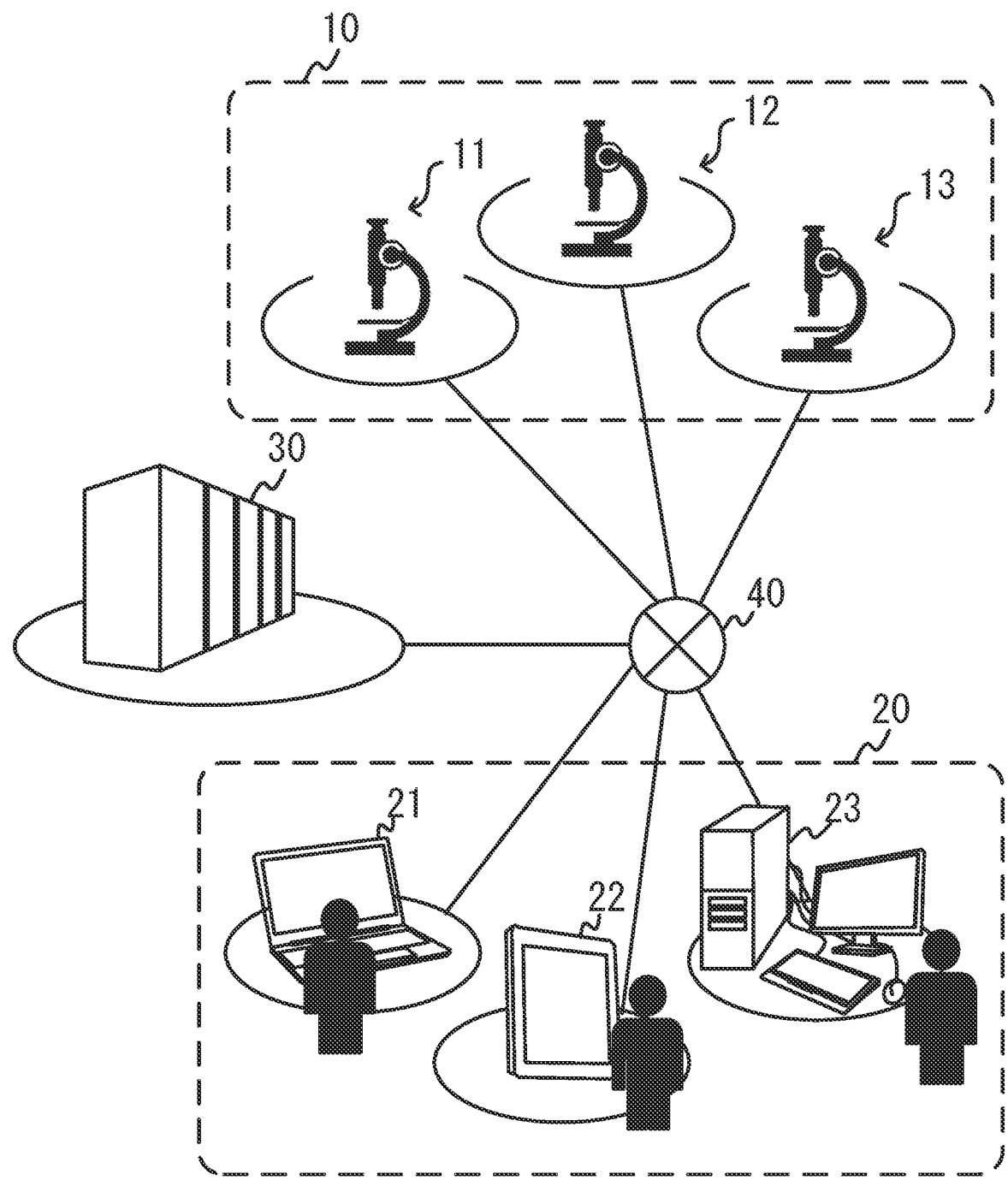
F I G. 1

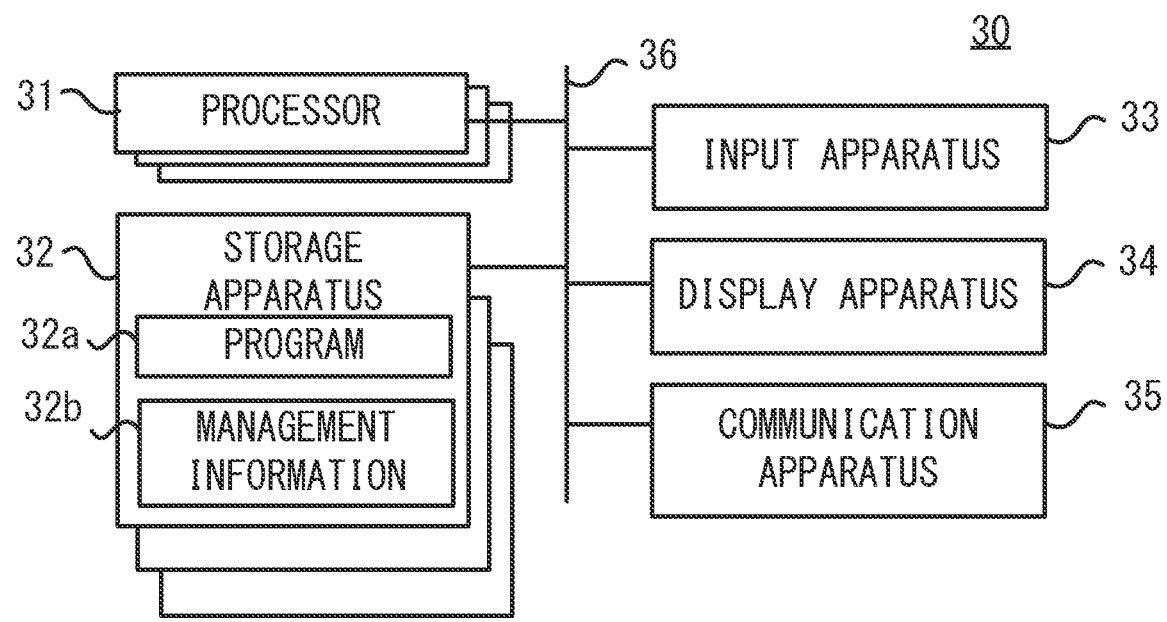
F I G. 6

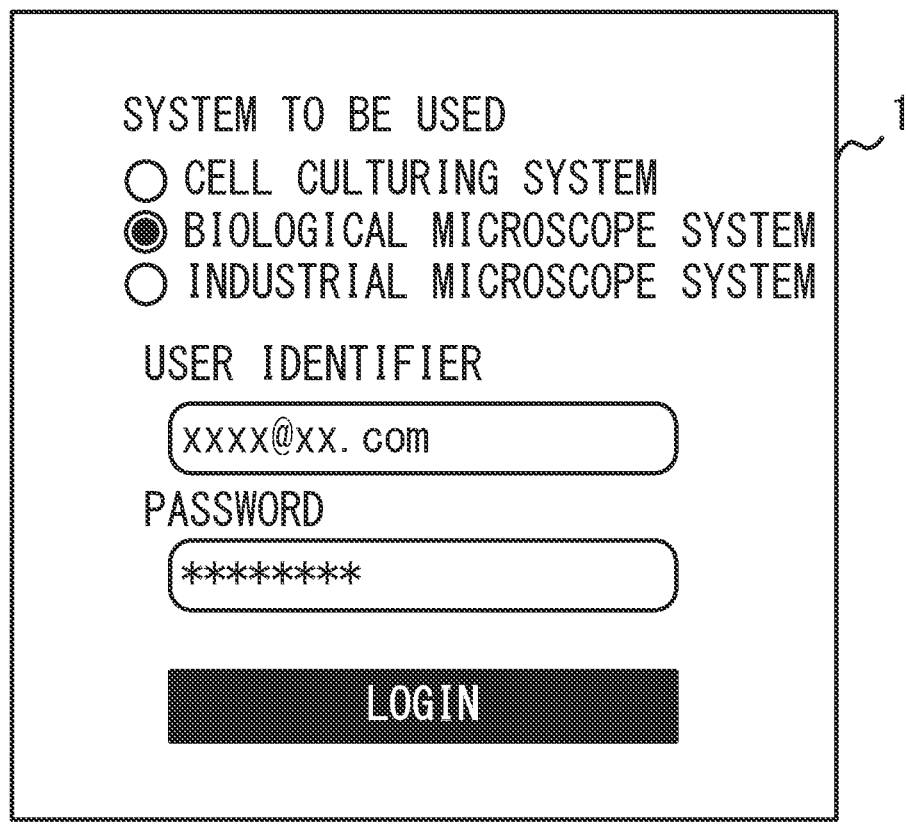
F I G. 1 3

T1

| USER ID | PASSWORD | USER NAME | BENEFIT |
|---|---|---|---|
| xxxx@xx.com | *** | *** | NONE |
| yyyy@xx.com | *** | *** | NONE |
| zzzz@xx.com | *** | *** | BENEFIT A, B |
| aaaa@xx.com | *** | *** | BENEFIT A |
| ... | ... | ... | ... |

FIG. 14

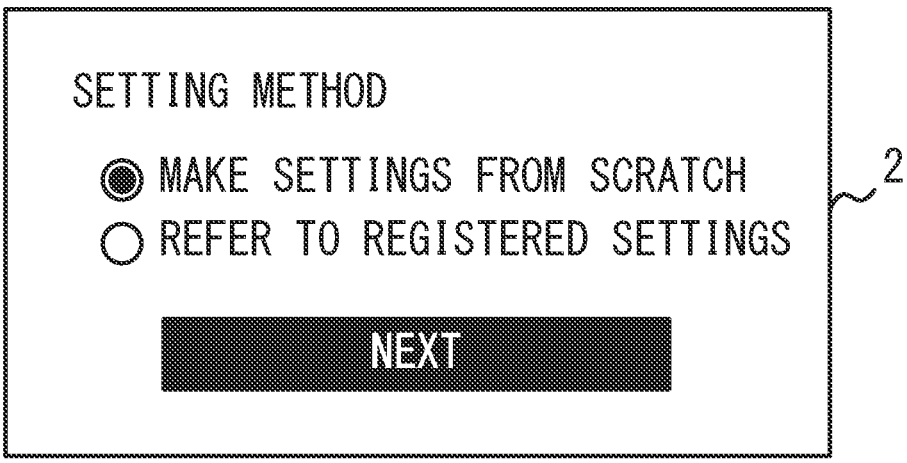
F I G. 15

T2

| USER ID | SETTING ID |
|---|---|
| xxxx@xx.com | ***** |
| xxxx@xx.com | ***** |
| yyyy@xx.com | ***** |
| ... | ... |

FIG. 16

| SETTING ID | EXPERIMENT NAME (PROJECT NAME) | CREATION DATE | EVALUATION AVERAGE | NUMBER OF USES | PUBLICATION PERMISSIBILITY/ IMPERMISSIBILITY | APPARATUS ID | APPARATUS SETTING ID | CELL ID | CONTAINER ID | ANALYTICAL PROCESS ID |
|---|---|---|---|---|---|---|---|---|---|---|
| ****** | ****** | *** | 5 | 150 | PERMITTED | *** | ****** | *** | *** | *** |
| ****** | ****** | *** | 4 | 12 | PERMITTED | *** | ****** | *** | *** | *** |
| ****** | ****** | *** | 3 | 50 | PERMITTED | *** | ****** | *** | *** | *** |
| ⋮ | ⋮ | ⋮ | ⋮ | ⋮ | ⋮ | ⋮ | ⋮ | ⋮ | ⋮ | ⋮ |
| ****** | ****** | *** | — | 0 | PERMITTED | *** | ****** | *** | *** | *** |

F I G. 1 7

I4

| APPARATUS SETTING ID | ITEM | DETAILS |
|---|---|---|
| m001 | STATE OF LIGHT-PATH SWITCHING TURRET | *** |
| m001 | OBJECTIVE | *** |
| m001 | LASER WAVELENGTH | *** |
| ... | ... | ... |
| m002 | STATE OF LIGHT-PATH SWITCHING TURRET | *** |
| m002 | PINHOLE DIAMETER | *** |
| m002 | TYPE OF SCANNER | *** |
| ... | ... | ... |

FIG. 18

| CELL ID | ITEM | DETAILS |
|---|---|---|
| c001 | CELL TYPE | *** |
| c001 | NAME OF MEDIUM | *** |
| c001 | AMOUNT OF MEDIUM | *** |
| c001 | TYPE OF PRIMARY ANTIBODY | *** |
| c001 | REAGENT CONCENTRATION OF PRIMARY ANTIBODY | *** |
| c001 | MARKER OF PRIMARY ANTIBODY | *** |
| c001 | REAGENT LOT NUMBER OF PRIMARY ANTIBODY | *** |
| c001 | TYPE OF SECONDARY ANTIBODY | *** |
| c001 | REAGENT CONCENTRATION OF SECONDARY ANTIBODY | *** |
| c001 | MARKER OF SECONDARY ANTIBODY | *** |
| c001 | REAGENT LOT NUMBER OF SECONDARY ANTIBODY | *** |
| c001 | TARGET (ANTIGEN) | *** |
| c001 | VECTOR | *** |
| ... | ... | ... |
| c002 | CELL TYPE | *** |
| c002 | CELL NAME | *** |
| c002 | AMOUNT OF MEDIUM | *** |
| c002 | TYPE OF PRIMARY ANTIBODY | *** |
| c002 | REAGENT CONCENTRATION OF PRIMARY ANTIBODY | *** |
| c002 | MARKER OF PRIMARY ANTIBODY | *** |
| c002 | REAGENT LOT NUMBER OF PRIMARY ANTIBODY | *** |
| c002 | TYPE OF SECONDARY ANTIBODY | *** |
| c002 | REAGENT CONCENTRATION OF SECONDARY ANTIBODY | *** |
| c002 | MARKER OF SECONDARY ANTIBODY | *** |
| c002 | REAGENT LOT NUMBER OF SECONDARY ANTIBODY | *** |
| c002 | TARGET (ANTIGEN) | *** |
| c002 | VECTOR | *** |

| CONTAINER ID | ITEM | DETAILS |
|---|---|---|
| v001 | CONTAINER TYPE | *** |
| v001 | AREA | *** |
| v001 | MAKER | *** |
| v001 | MODEL NUMBER | *** |
| v001 | CONTAINER NAME | *** |
| ... | ... | ... |
| v002 | CONTAINER TYPE | *** |
| ... | ... | ... |

| ANALYTICAL PROCESS ID | ITEM | DETAILS |
|---|---|---|
| a001 | TYPE OF ANALYTICAL PROCESS | *** |
| a001 | PARAMETER (LEARNING DATA) | *** |
| a001 | PARAMETER (NOISE THRESHOLD) | *** |
| a001 | MEASUREMENT RESULT (NUMBER) | *** |
| a001 | MEASUREMENT RESULT (DENSITY) | *** |
| a001 | MEASUREMENT RESULT (AREA) | *** |
| a001 | MEASUREMENT RESULT (IMAGE) | *** |
| ... | ... | ... |

F I G. 2 1

SEARCH CONDITIONS

∨ SETTING OF OBSERVATION LIGHT PATH
∨ LSM
∨ EPI-ILLUMINATION OBSERVATION
∨ TRANSMITTED-ILLUMINATION OBSERVATION
∨ COMMON

FREE TEXT

SEARCH

FIG. 22

SEARCH CONDITIONS

> SETTING OF OBSERVATION LIGHT PATH

| LIGHT-PATH SWITCHING TURRET | --- ▼ |

| EPI-ILLUMINATION SWITCHING MIRROR | --- ▽ |

∨ LSM
∨ EPI-ILLUMINATION OBSERVATION
∨ TRANSMITTED-ILLUMINATION OBSERVATION
∨ COMMON

FREE TEXT

[          ]

SEARCH

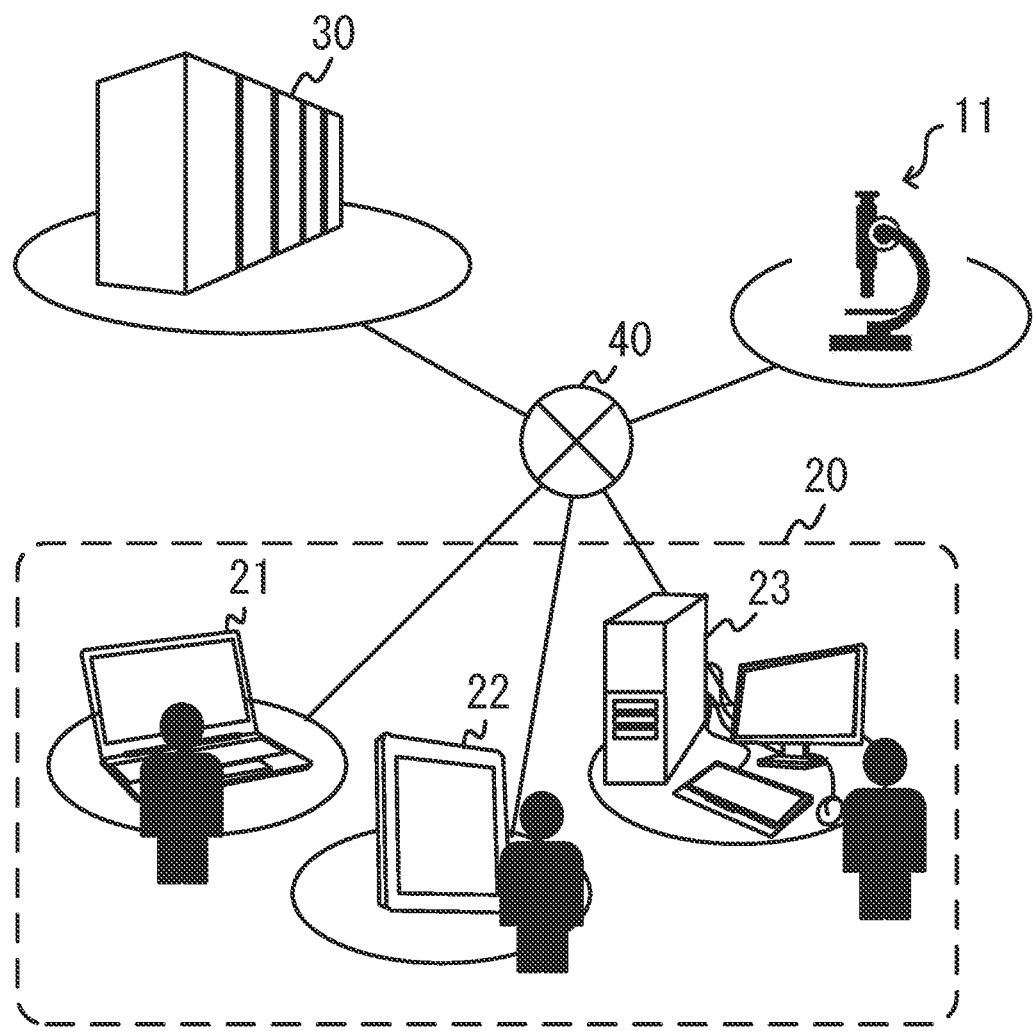
F I G. 2 5

MANAGEMENT SYSTEM, MANAGEMENT METHOD, AND COMPUTER-READABLE MEDIUM

CROSS REFERENCE TO RELATED APPLICATIONS

This application is based upon and claims the benefit of priority from prior Japanese Patent Application No. 2020-182792, filed Oct. 30, 2020, the entire contents of which are incorporated herein by this reference.

BACKGROUND OF THE INVENTION

Field of the Invention

The disclosure herein relates to a management system, a management method, and a computer-readable medium for managing setting information of an observation system.

Description of the Related Art

As a general rule, there are varieties of setting items for a microscope system that includes a microscope apparatus, and it is not easy for an inexperienced user who is unfamiliar with a microscope system to use the microscope system by means of settings appropriate for observation. In the meantime, a microscope system is expensive, and such a system is often shared by a plurality of persons for use. In view of such a circumstance, it will be very convenient for a user who is inexperienced for a microscope system if there is a mechanism allowing for use of settings that were used by another user who shares the microscope system with the inexperienced user, in particular settings that were used by a user skilled for the microscope system.

Techniques pertaining to share and management of settings of a microscope system is described in, for example, Japanese Laid-open Patent Publication No. 2019-159164. Japanese Laid-open Patent Publication No. 2019-159164 describes a technique for performing unified management of settings of a plurality of microscope apparatuses by means of an information processing apparatus connected to the plurality of microscope apparatuses over a network. Applying a technology for performing unified management of setting information of a plurality of microscope apparatuses as described in Japanese Laid-open Patent Publication No. 2019-159164 allows a user inexperienced for a microscope system to use settings that were used by another user who shares the microscope system with the inexperienced user.

SUMMARY OF THE INVENTION

A management system according to an aspect of the present invention manages setting information of an observation system and includes one or more non-transitory computer-readable media that include an instruction and one or more processors that execute the instruction, wherein the instruction is configured to cause the one or more processors to perform an operation, and the operation includes detecting a use status of a setting indicated by the setting information and updating, in accordance with the detected use status, evaluation information indicating an evaluation pertaining to the setting, the evaluation information being managed so as to be associated with the setting information.

A management method according to an aspect of the present invention is implemented by a management system for managing setting information of an observation system and includes detecting a use status of a setting indicated by the setting information and updating, in accordance with the detected use status, evaluation information indicating an evaluation pertaining to the setting, the evaluation information being managed so as to be associated with the setting information.

A non-transitory computer-readable medium according to an aspect of the present invention has stored therein a program for causing a computer for a management system for managing setting information of an observation system to perform a process for: detecting a use status of a setting indicated by the setting information; and updating, in accordance with the detected use status, evaluation information indicating an evaluation pertaining to the setting, the evaluation information being managed so as to be associated with the setting information.

BRIEF DESCRIPTION OF THE DRAWINGS

The present invention will be more apparent from the following detailed description when the accompanying drawings are referenced.

FIG. 1 illustrates the configuration of a system in accordance with an embodiment;

FIG. 6 exemplifies the configuration of a management system 30;

FIG. 13 illustrates an example of a login screen;

FIG. 14 illustrates an example of a user information table;

FIG. 15 illustrates an example of a setting method selection screen;

FIG. 16 illustrates an example of a user/setting table;

FIG. 17 illustrates an example of a setting information table;

FIG. 18 illustrates an example of an apparatus-setting-information table;

FIG. 19 illustrates an example of a cell information table;

FIG. 20 illustrates an example of a container information table;

FIG. 21 illustrates an example of an analytical process information table;

FIG. 22 illustrates an example of a search condition screen;

FIG. 25 illustrates the configuration of a system in accordance with another embodiment.

DESCRIPTION OF THE EMBODIMENTS

Figure 2:
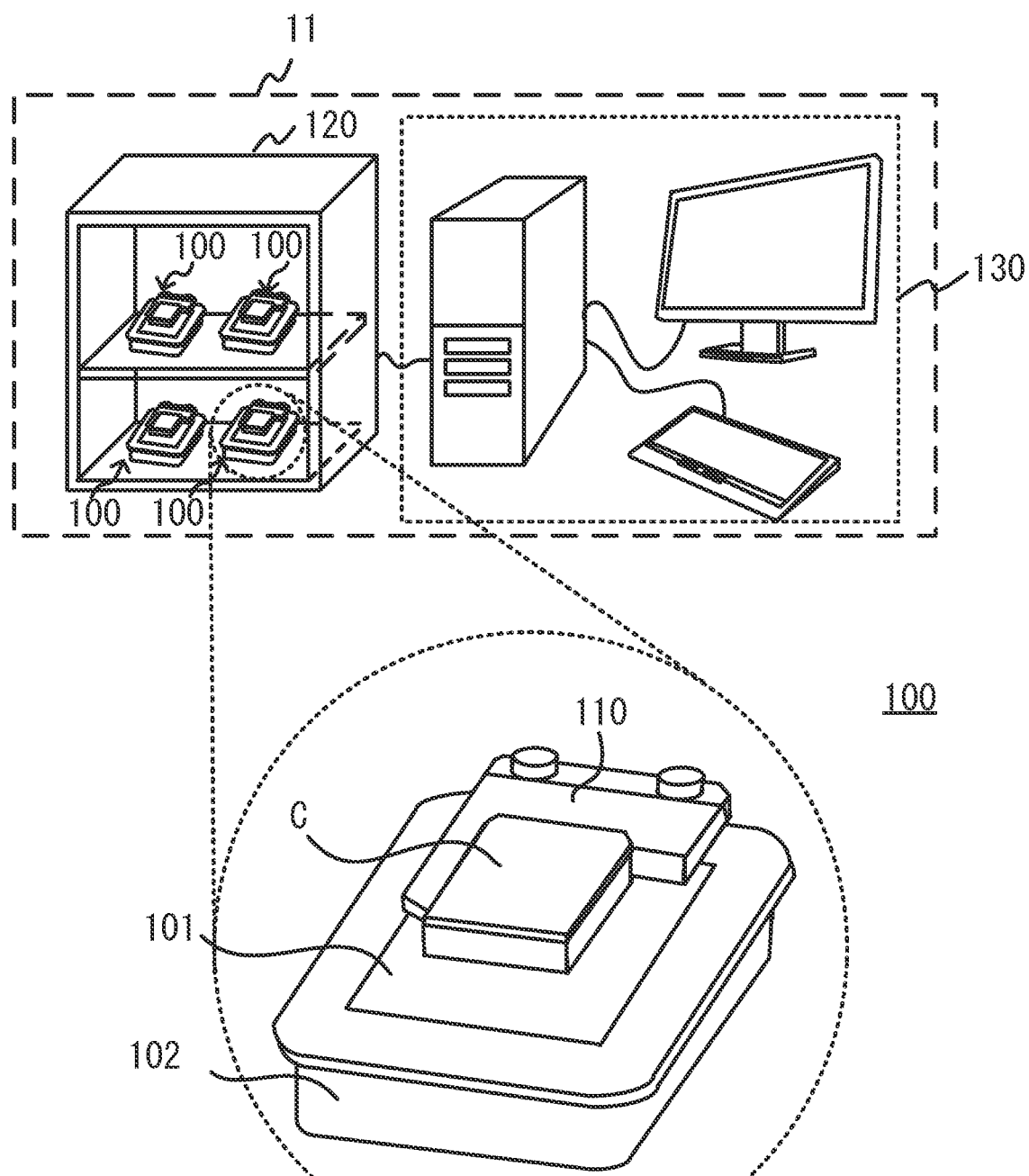
FIG. 2 exemplifies the configuration of an observation system 11.

Simply performing unified management of a plurality of settings used by a plurality of users and allowing the plurality of users to share the plurality of settings does not provide a sufficient advantage. This is because it will be difficult for a user inexperienced for a microscope system to appropriately determine which setting should be used, if a guideline for the determination is not provided, and thus it will be difficult for the user to select appropriate settings efficiently.

Although descriptions have been given so far with reference to examples pertaining to a microscope system, the problem is not limited to the microscope system and could arise in any observation system that includes an image capturing apparatus for which varieties of settings can be made.

Considering such circumstances, an embodiment of the present invention will be described hereinafter.

FIG. 1 illustrates the configuration of a system in accordance with an embodiment. The system depicted in FIG. 1 includes an observation system 10 (observation systems 11, 12, and 13), a user terminal 20 (user terminals 21, 22, and 23), and a management system 30, which are connected to each other via a network 40.

The following descriptions are based on an example in which the network 40 is the Internet, and the observation system 10, the user terminal 20, and the management system 30 communicate with each other via the Internet. However, the type of the network 40 is not particularly limited. For example, the network 40 may be a public line such as the Internet or may be a dedicated line. The network 40 may be a LAN, and for example, the observation system 10, the user terminal 20, and the management system 30 may be connected to each other by a wireless LAN via an access point (not illustrated).

The observation system 10 is a system for observing an object such as a sample or a specimen. The observation system 10 includes one or more observation systems (observation systems 11, 12, and 13). The observation system 10 is a general term for the observation systems included in the observation system 10. However, when the observation systems included in the observation system 10 do not need to be particularly distinguished from each other, the observation systems included in the observation system 10 will each be referred to as an observation system 10 herein.

The observation system 10 includes at least an image capturing apparatus for capturing an image of an object to be observed. The observation system 10 may also include a control apparatus for controlling the image capturing apparatus. For example, the image capturing apparatus may be, but is not particularly limited to, an optical microscope apparatus. The image capturing apparatus may be, for example, an application-specific image capturing apparatus dedicated to observing cultured cells or the like. Alternatively, the image capturing apparatus may be, for example, another image capturing apparatus such as an electron microscope apparatus, an endoscope apparatus, or a digital camera.

The optical microscope apparatus, i.e., an image capturing apparatus, may be a biological microscope apparatus or an industrial microscope apparatus. An object to be observed may be, but is not particularly limited to, a biological sample such as a cultured cell, a cellular aggregate, or a pathological specimen, or an industrial sample such as an electronic circuit board, an electronic component, or an industrial material.

The user terminal 20 is used by a user of the observation system 10 to remotely operate the observation system 10. The user terminal 20 includes one or more user terminals (user terminals 21, 22, and 23). Note that the user terminal 20 is a general term for the user terminals included in the user terminal 20. However, when the user terminals included in the user terminal 20 do not need to be particularly distinguished from each other, the user terminals included in the user terminal 20 will each be referred to as a user terminal 20 herein.

The user terminal 20 may be a computer that has a communication function and a display function. For example, the user terminal 20 may be, but is not particularly limited to, a desktop computer, a laptop computer, a tablet computer, a smartphone, or a portable telephone. Each of the user terminals 20 may be a dedicated terminal for a particular user or a shared terminal shared by a plurality of users.

The management system 30 manages setting information of the observation system 10. The setting information of the observation system 10 indicates settings of the observation system 10. The management system 30 provides the setting information to a user in response to his/her request. More specifically, the management system 30 manages evaluation information indicating an evaluation pertaining to settings of the observation system 10 such that the evaluation information is associated with pieces of setting information, and provides the pieces of setting information, which have been assigned priory levels on the basis of the evaluation information, to a user in response to his/her request.

The evaluation information managed by the management system 30 is updated in accordance with the use status of a setting of the observation system 10. More specifically, the management system 30 detects the use status of a setting and updates the evaluation information in accordance with the detected use status. The timings at which a use status is detected do not necessarily need to be synchronous with the timings at which a setting is used. The management system 30 may detect the use of a setting as soon as the setting is used, or may periodically detect a use status for a certain period. The timings at which evaluation information is updated do not necessarily need to be synchronous with the timings at which a use status is detected. The management system 30 may update evaluation information as soon as a use status is detected, or may periodically update evaluation information without synchronization with the timings at which a use status is detected.

Figure 3:
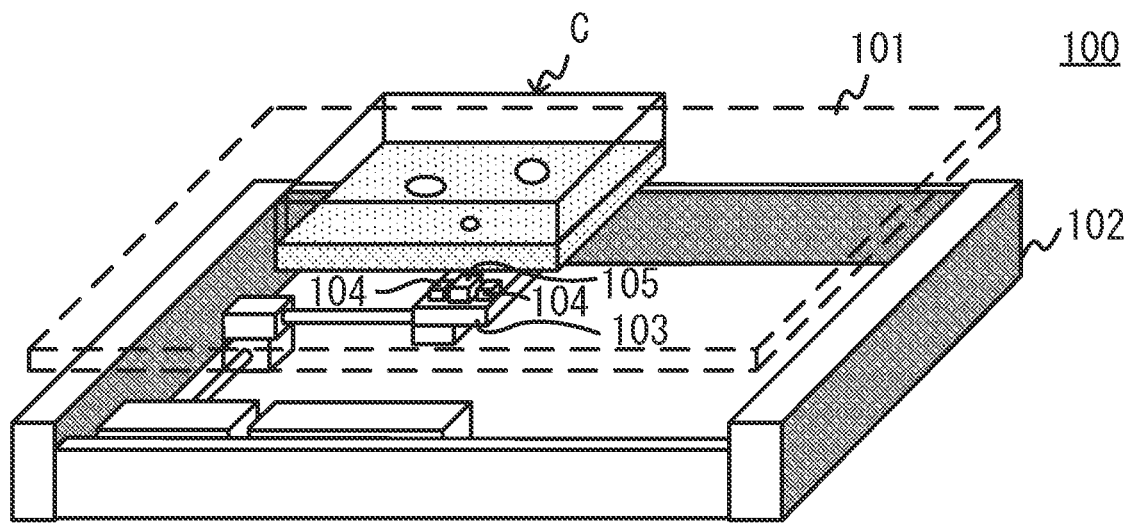
FIG. 3 exemplifies the configuration of an image capturing apparatus 100.
Figure 4:
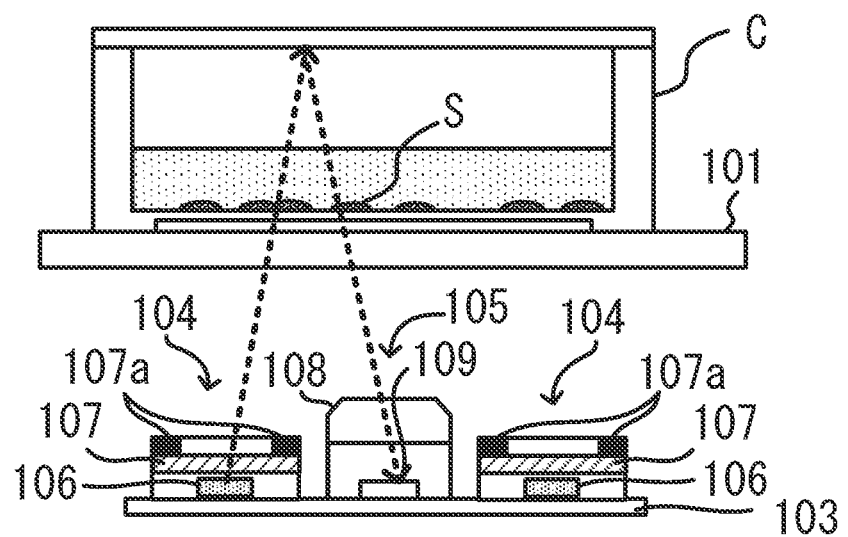
FIG. 4 exemplifies the configurations of light source units 104 and an image capturing unit 105.

FIG. 2 exemplifies the configuration of the observation system 11. FIG. 3 exemplifies the configuration of an image capturing apparatus 100. FIG. 4 exemplifies the configurations of light source units 104 and an image capturing unit 105. By referring to FIGS. 2-4, the following describes the configuration of the observation system 11 included in the observation system 10 and the settings of the observation system 11.

The observation system 11 depicted in FIG. 2 is a cell culturing system for capturing images of cells accommodated within containers C while culturing the same. The observation system 11 includes one or more image capturing apparatuses 100 that capture, from below the containers C, images of the cultured cells accommodated within the containers C, and a control apparatus 130 that controls the image capturing apparatuses 100.

Each of the image capturing apparatuses 100 and the control apparatus 130 may communicate data with each other. Thus, each of the image capturing apparatuses 100 and the control apparatus 130 may be communicably connected to each other by a wired link or wirelessly. The container C for accommodating cultured cells is, for example, a flask. However, the container C is not limited to a flask but may be another culture container such as a dish or a well plate.

For example, the image capturing apparatus 100 may be used while disposed within an incubator 120 as depicted in FIG. 2, so that an image of cultured cells can be captured without the cultured cells being removed from the incubator 120. More specifically, the image capturing apparatus 100 is, as depicted in FIG. 2, disposed within the incubator 120 with the container C placed on a permeable window 101 of the image capturing apparatus 100, and acquires an image of a sample (cells) within the container C in accordance with an instruction from the control apparatus 130. The permeable window 101 is a transparent top plate forming an upper surface of a housing 102 of the image capturing apparatus 100 and forms a placement surface on which the container is placed. For example, the permeable window 101 may be formed from glass or a transparent resin.

As depicted in FIG. 2, the image capturing apparatus 100 includes: the housing 102, which is shaped like a box and has, as an upper surface, the transparent permeable window 101 on which the container C is placed; and a positioning member 110 that positions the container C at a predetermined position on the permeable window 101 (placement surface). The positioning member 110 is fixed to the housing 102. However, the positioning member 110 can be detached according to need and may be replaced with another positioning member having a different shape in accordance with what container is used.

As depicted in FIGS. 3 and 4, the image capturing apparatus 100 further includes : a stage 103 that moves within the housing 102; a pair of light source units 104 that illuminate cultured cells; and an image capturing unit 105 that acquires an image of the cultured cells. The stage 103, the light source units 104, and the image capturing unit 105 are accommodated within the housing 102. The light source units 104 and the image capturing unit 105 are set on the stage 103 and move relative to the container C in accordance with the stage 103 moving within the housing 102.

The stage 103 changes the position of the image capturing unit 105 relative to the container C. The stage 103 can move in an X direction and a Y direction that are parallel to the permeable window 101 (placement surface) and orthogonal to each other. However, the stage 103 may also move in a Z direction (height direction) orthogonal to both of the X and Y directions.

FIGS. 3 and 4 depict an example in which the light source units 104 and the image capturing unit 105 are set on the stage 103 and, as a result, move within the housing 102 as a single body. However, the light source units 104 and the image capturing unit 105 may move within the housing 102 independently from each other. Although FIGS. 3 and 4 indicate an example in which the pair of light source units 104 are arranged in a left-right direction with the image capturing unit 105 therebetween, the arrangement and number of light source units 104 are not limited to this example. For example, three or more light source units 104 or only one light source unit 104 may be provided on the stage 103.

As depicted in FIG. 4, the light source unit 104 includes a light source 106 and a diffuser panel 107. The light source 106 includes, for example, a light emitting diode (LED). The light source 106 may include a white LED or a plurality of LEDs for emitting rays of light having a plurality of different wavelengths, e.g., red (R) light, green (G) light, and blue (B) light. Light emitted from the light source 106 is incident on the diffuser panel 107.

The diffuser panel 107 diffuses light emitted from the light source 106. For example, the diffuser panel 107 may be, but is not particularly limited to, a frosted diffuser panel having an uneven surface. However, the diffuser panel 107 may be an opal diffuser panel having a coated surface or another type of diffuser panel. In addition, a mask 107a for limiting the region of emission of diffused light may be formed on the diffuser panel 107. Light emitted from the diffuser panel 107 advances in various directions.

As depicted in FIG. 4, the image capturing unit 105 includes an optical system 108 and an image pickup element 109. The optical system 108 collects light that has entered the housing 102 by passing through the permeable window 101. For example, the optical system 108 may be, but is not particularly limited to, a finite-correction objective that forms an image at a finite position. However, as long as the entirety of the optical system 108 forms a finite-correction optical system, the optical system 108 may include an infinity-corrected objective. The optical system 108, which has a focal point on the bottom surface of the container C in which a cultured cell is present, focuses light entering the housing 102 onto the image pickup element 109, thereby forming an optical image of the cultured cell on the image pickup element 109.

The image pickup element 109 is an optical sensor that converts detected light into an electric signal. In particular, the image pickup element 109 is an image sensor and, for example, may be, but is not particularly limited to, a charge-coupled-device (CCD) image sensor or a complementary-MOS (CMOS) image sensor.

The image capturing apparatus 100 having the above-described configuration uses oblique illumination so as to visualize a sample S (cultured cell), i.e., a phase object, within the container C. In particular, light emitted by the light source 106 is diffused by the diffuser panel 107 and sent to the outside of the housing 102. That is, the light source unit 104 emits light that advances in various directions toward the outside of the housing 102 without traveling via the optical system 108. Then, a portion of the light emitted to the outside of the housing 102 is reflected on, for example, the upper surface of the container C and thus deflected above the sample S. In addition, a portion of the light deflected above the sample S illuminates the sample S and passes through the sample S and the permeable window 101, thereby entering the housing 102. A portion of the light that has entered the housing 102 is focused by the optical system 108, thereby forming an image of the sample S on the image pickup element 109. Finally, the image capturing apparatus 100 generates an image of the sample S (cultured cell) on the basis of an electric signal output from the image pickup element 109 and outputs the generated image to the control apparatus 130.

The control apparatus 130 controls the image capturing apparatuses 100. The control apparatus 130 transmits an image capturing instruction to an image capturing apparatus 100 placed within the incubator 120 and receives an image acquired by the image capturing apparatus 100. The control apparatus 130 may perform various analytical processes for the obtained image. For example, a cell count may be measured by counting the number of cultured cells included in the image. The density and area of the cells may be measured from the image.

The settings of the observation system 11 that has the configuration described above include the settings of the image capturing apparatus 100 and the settings of the analytical process for an image acquired by the image capturing apparatus 100. For example, the settings of the image capturing apparatus 100 may include, as setting items, the position of the stage 103 (observation position), the intensity of illumination of the light source units 104, the exposure time and gain of the image capturing unit 105, and time-lapse image capturing settings such as a cycle on which image capturing is performed and the number of times image capturing is performed. For example, the settings of the analytical process may include, as setting items, cell count measurement, cell density measurement, and cell area measurement.

Figure 5:
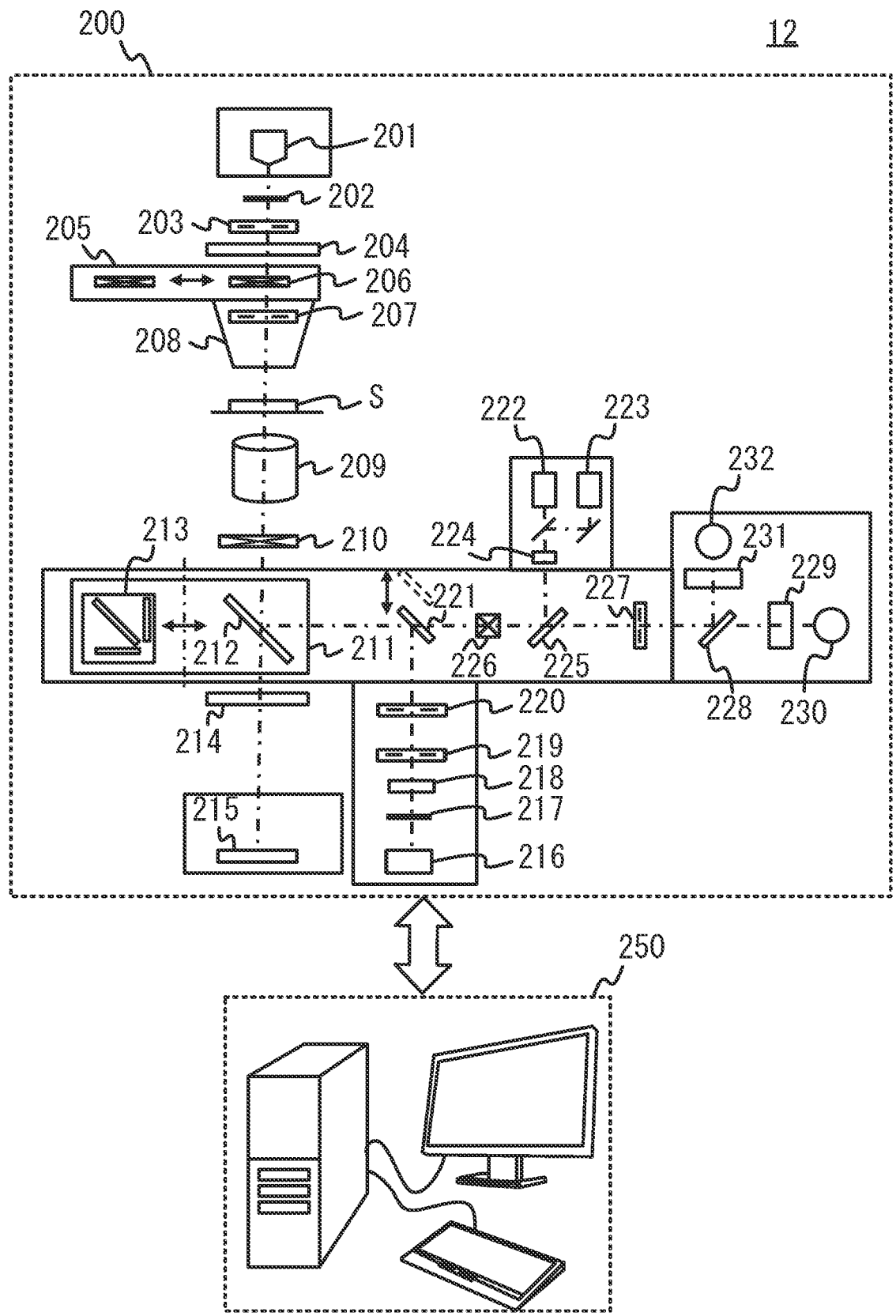
FIG. 5 exemplifies the configuration of an observation system 12.

FIG. 5 exemplifies the configuration of the observation system 12. By referring to FIG. 5, the following describes the configuration of the observation system 12 included in the observation system 10 and the settings of the observation system 12.

The observation system 12 depicted in FIG. 5 is a laser scanning microscope system and includes a microscope apparatus 200, i.e., an example of the image capturing apparatus, and a control apparatus 250. The microscope apparatus 200 can acquire various images such as fluorescence images, bright field images, differential interference images, phase-contrast images by changing the settings of the microscope apparatus 200.

The microscope apparatus 200 includes a transmitted-illumination light source 201 and also includes, on a transmitted illumination light path, a shutter 202, a field stop 203, a polarizer 204, a differential interference element 206 accommodated in a condenser turret 205, an aperture stop 207, and a condensing lens 208.

The microscope apparatus 200 also includes an image pickup element 215 and includes, on an observation light path leading to the image pickup element 215, an objective 209, a differential interference element 210, a total reflection mirror 212 and fluorescence cube 213 accommodated in a light-path switching turret 211, and an analyzer 214.

The microscope apparatus 200 also includes an epi-illumination light source 216 and includes, on an epi-illumination light path, a shutter 217, an ND filter 218, an aperture stop 219, a field stop 220, and an epi-illumination switching mirror 221.

The microscope apparatus 200 also includes a laser unit including a plurality of lasers (lasers 222 and 223) and an AOTF (Acousto-Optic Tunable Filter) 224, and includes, on a laser-illumination light path, a dichroic mirror 225 and a scanner 226.

The microscope apparatus 200 also includes a two-channel LSM (Laser Scanning Microscope) detector. The LSM detector includes a dichroic mirror 228, a pair of spectrometers (spectrometers 229 and 231), and a pair of detectors (detectors 230 and 232). The microscope apparatus 200 includes a confocal stop 227 on a detection light path leading to the LSM detector.

The settings of the observation system 12 that has the configuration described above include the settings of the microscope apparatus 200 and the settings of the analytical process for an image acquired by the microscope apparatus 200. For example, the settings of the analytical process may include, as a setting item, measurement of the average luminance of a region of interest (ROI). The settings of the microscope apparatus 200 include, as setting items, settings items pertaining to the observation light path, setting items pertaining to LSM, setting items pertaining to epi-illumination observation, setting items pertaining to transmitted-illumination observation, and other common setting items.

In particular, for example, the settings of the microscope apparatus 200 may include, as setting items pertaining to the observation light path, the state of the light-path switching turret 211 (total reflection mirror, empty hole, or fluorescence cube) and the state of the epi-illumination switching mirror 221 (IN/OUT).

For example, the settings of the microscope apparatus 200 may also include, as setting items pertaining to LSM, the state of the lasers 222 and 223 (used wavelength, intensity), the state of the confocal stop 227 (pinhole diameter), the state of the dichroic mirror 225 for excitation (type of the dichroic mirror 225), the state of the LSM detector (type of the dichroic mirror 228 for measurement, used channel, detection wavelength, voltage applied to the detector).

For example, the settings of the microscope apparatus 200 may also include, as setting items pertaining to epi-illumination observation, the state of the fluorescence cube 213 (type of the fluorescence cube 213), the state of the ND filter 218 (intensity of epi-illumination), the state of the shutter 217 (IN/OUT), the state of the aperture stop 219 and the field stop 220 (field number, numerical aperture), and the state of the image pickup element 215 (exposure time, gain).

For example, the settings of the microscope apparatus 200 may also include, as setting items pertaining to transmitted-illumination observation, the state of the condensing lens 208 (type of condensing lens 208), the setting of the transmitted-illumination light source 201 (intensity of transmitted illumination, setting voltage of a lamp), the state of the shutter 202 (IN/OUT), the state of the field stop 203 and the aperture stop 207 (field number, numerical aperture), the state of the image pickup element 215 (exposure time, gain), and the state of the condenser turret 205 (type of differential interference element 206).

For example, the settings of the microscope apparatus 200 may include, as the other common setting items, the state of the objective 209 (type of objective 209), the state of time-lapse image capturing settings (cycle on which image capturing is performed, number of times image capturing is performed), and the state of light stimulation settings (wavelength of stimulus light, irradiation intensity, irradiation time, sequence with image capturing).

Figure 7:
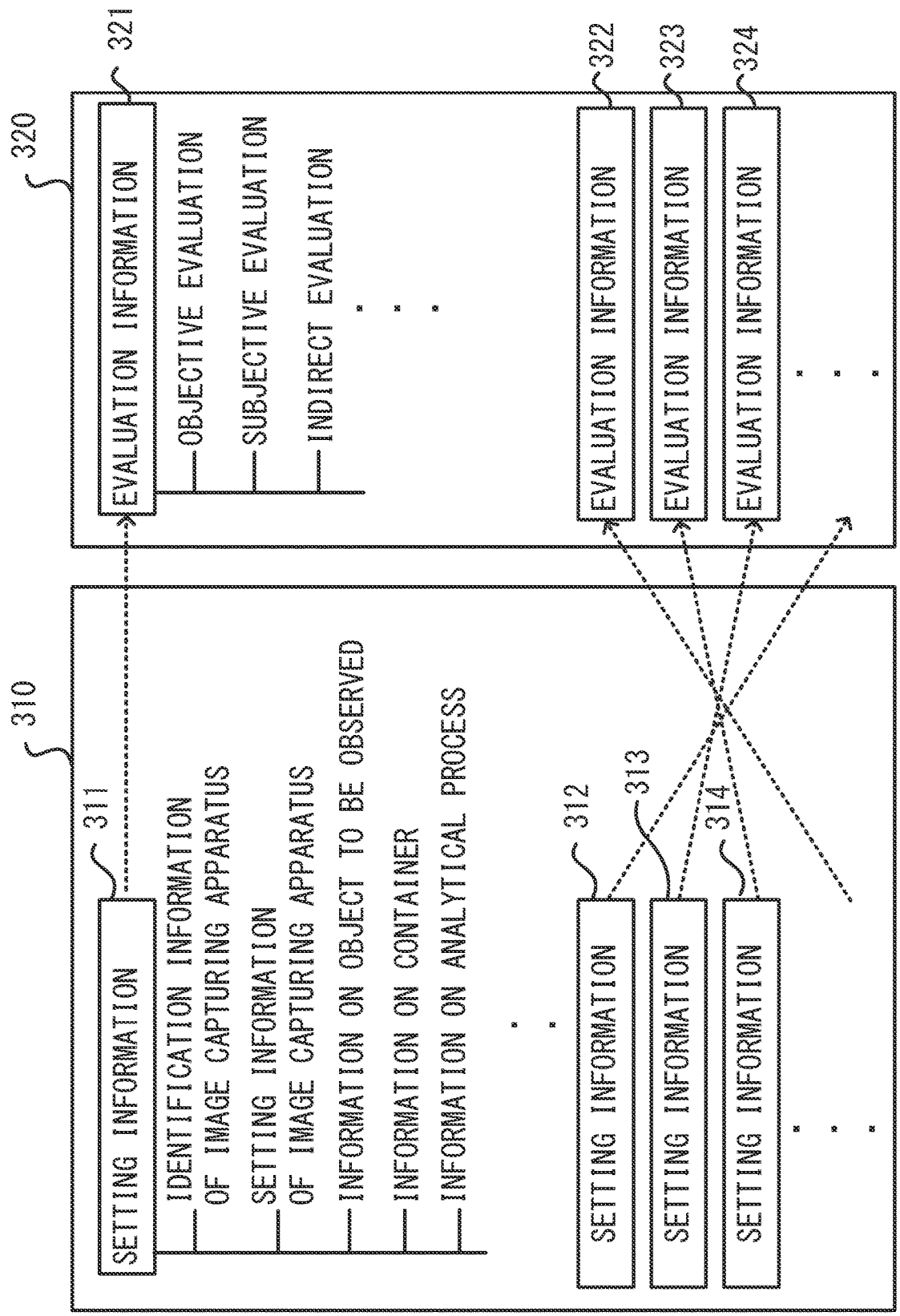
FIG. 7 is an explanatory diagram for a relationship between setting information 310 and evaluation information 320.

FIG. 6 exemplifies the configuration of the management system 30. FIG. 7 is an explanatory diagram for a relationship between setting information 310 and evaluation information 320. By referring to FIGS. 6 and 7, the following describes the configuration of the management system 30 and information managed by the management system 30.

For example, the management system 30 may include, as depicted in FIG. 6, one or more processors 31, one or more storage apparatuses 32, an input apparatus 33, a display apparatus 34, and a communication apparatus 35, which may be connected by a bus 36.

For example, the one or more processors 31 may each be hardware including a central processing unit (CPU), a graphics processing unit (GPU), and/or a digital signal processor (DSP), and execute a program 32a stored in the one or more storage apparatuses 32 so as to execute an instruction included in the program 32a, thereby performing a programmed operation. The one or more processors 31 may also include an application specific integrated circuit (ASIC) and/or a field-programmable gate array (FPGA).

The one or more storage apparatuses 32 are each a non-transitory computer-readable medium. For example, the one or more storage apparatuses 32 may include one or more semiconductor memories of any type and also include one or more other storage apparatuses. For example, the semiconductor memories may include volatile memories such as random access memories (RAMS) and/or nonvolatile memories such as read only memories (ROMs), programmable ROMs, or flash memories. The RAMS may include, for example, dynamic random access memories (DRAMs) and/or static random access memories (SRAMs). The other storage apparatuses may include, for example, magnetic storage apparatuses including magnetic disks and/or optical storage apparatuses including optical discs.

The one or more storage apparatuses 32 store the program 32a and management information 32b. The program 32a and the management information 32b may be stored in the same storage apparatus 32 or different storage apparatuses 32. As indicated in FIG. 7, management information 32b includes setting information 310 and evaluation information 320.

Setting information 310 indicates the settings of the observation system 10 and is a set of one or more pieces of different setting information (setting information 311, setting information 312, setting information 313, setting information 314). For example, each of the pieces of setting information may include, as depicted in FIG. 7, identification information of an image capturing apparatus included in the observation system 10, setting information of the image capturing apparatus, information on an object to be observed by the observation system 10, information on a container for accommodating the object to be observed, and information on an analytical process performed for an image acquired by the image capturing apparatus. Each of the pieces of setting information may include at least one of the pieces of above information.

Evaluation information 320 indicates evaluations pertaining to the settings of the observation system 10 and is a set of one or more pieces of different evaluation information (evaluation information 321, evaluation information 322, evaluation information 323, evaluation information 324). Each of the pieces of evaluation information is associated with setting information pertaining to a setting to be evaluated. Accordingly, the storage apparatus 32 stores setting information 310 and evaluation information 320 associated with each other.

As depicted in FIG. 7, each of the pieces of evaluation information includes an objective evaluation, a subjective evaluation, and an indirect evaluation. For example, the objective evaluation may be the number of uses of a setting, the use frequency of the setting, or the rating of the number or frequency (e.g., rank S, rank A, rank B, . . . ). For example, the subjective evaluation may be a subjective evaluation given by a user who used the setting (e.g., very good, good, average, bad). For example, the indirect evaluation may be register person information of a resistor person who registered setting information. The register person information may be an example of the indirect information for a setting, in the sense that the setting can be evaluated according to the level of skill of the register person specified by the register person information. Each of the pieces of evaluation information may include at least one of the pieces of above information (objective, subjective, and indirect evaluations).

The input apparatus 33 is, for example, a keyboard, a mouse, or a touch panel. The display apparatus 34 is, for example, a liquid crystal display, an organic electroluminescence display, or a cathode ray tube (CRT) display. A touch panel may be installed in the display. The communication apparatus 35 may be a wire communication module or a wireless communication module. The management system 30 communicates with the observation system 10 and the user terminal 20 by using the communication apparatus 35.

The configuration depicted in FIG. 6 is an example of the hardware configuration of the management system 30, and the management system 30 is not limited to this configuration. The management system 30 may be a general-purpose or special-purpose apparatus.

Figure 8:
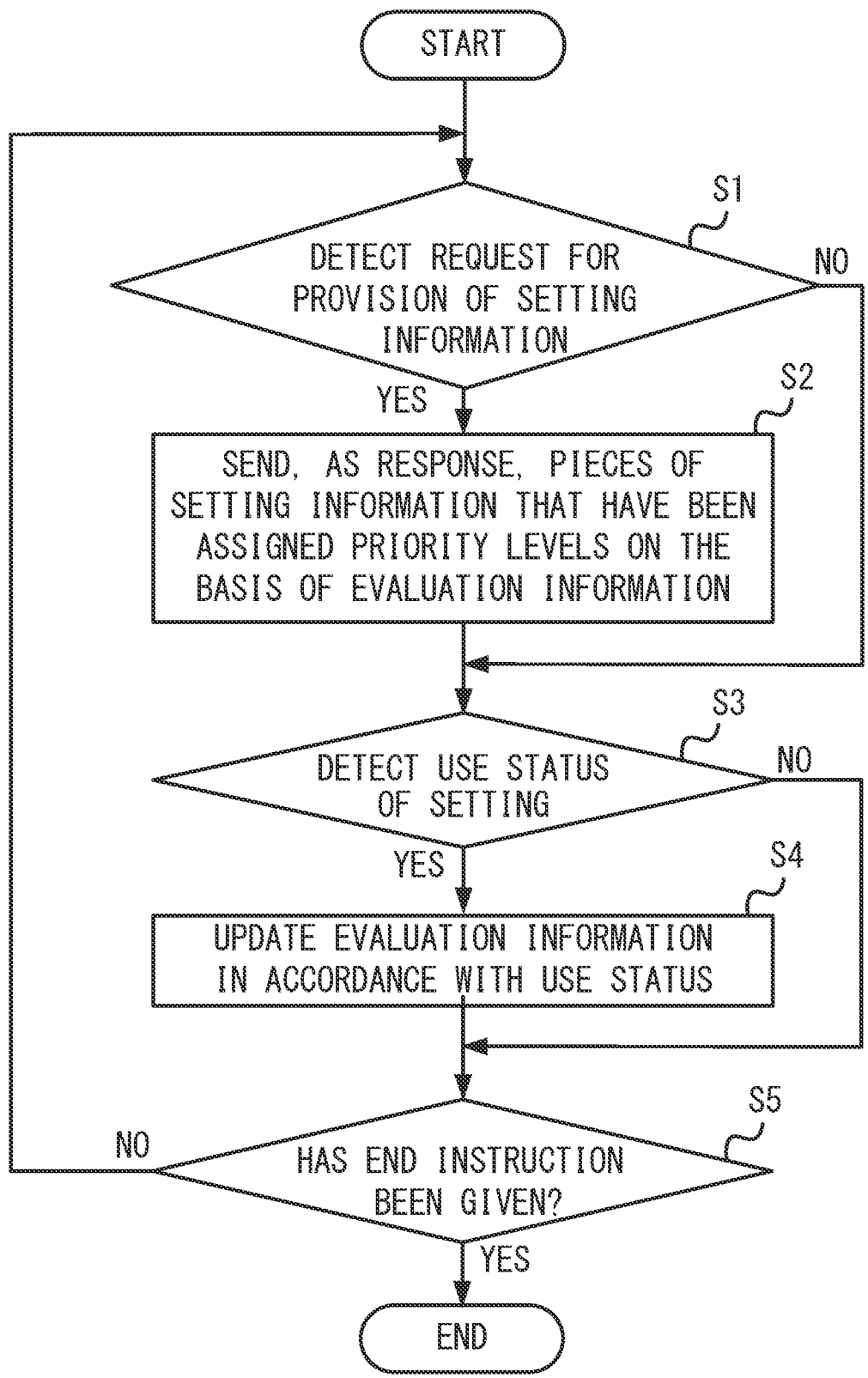
FIG. 8 is a flowchart illustrating an example of processes performed by a management system 30.

FIG. 8 is a flowchart illustrating an example of processes performed by the management system 30. By referring to FIG. 8, the following describes a method wherein the management system 30 manages setting information and provides the setting information at a request from a user. The processes depicted in FIG. 8 are an example of a management method implemented by the management system 30 that manages setting information of the observation system 10, and may be performed by, for example, the processor 31 executing the program 32a.

Upon the processes depicted in FIG. 8 being started, the processor 31 of the management system 30 first monitors a request for provision of setting information managed by the management system 30, i.e., a request to be sent from the user terminal 20 (step S1). When detecting a request for provision of setting information from the user terminal 20 (YES in step S1), the processor 31 sends, as a response, pieces of setting information that have been assigned priority levels on the basis of evaluation information (step S2). In particular, upon a request for provision of setting information, the processor 31 sends, to the user terminal 20 as a response, pieces of setting information that have been assigned priority levels on the basis of evaluation information (step S2).

In step S2, for example, the processor 31 may extract, from the storage apparatus 32, one or more pieces of setting information meeting a search condition included in the request. Then, the processor 31 may sort the one or more pieces of extracted setting information in the descending order of evaluation on the basis of one or more pieces of evaluation information corresponding to the one or more pieces of setting information. In addition, the processor 31 may transmit the one or more pieces of setting information that have been assigned priority levels through the sorting to the user terminal 20. When a request for provision of setting information is not detected in step S1 (NO in step S1), the processor 31 skips the process of step S2.

Next, the processor 31 monitors the use statuses of the settings of the observation system 10 (step S3). When detecting the use status of a setting (YES in step S3), the processor 31 updates the evaluation information in accordance with the use status (step S4). In particular, in accordance with the use status of the setting detected in step S3, the processor 31 updates evaluation information that indicates an evaluation pertaining to the setting and is managed so as to be associated with the setting information of the setting.

For example, in step S4, when detecting use of a certain setting, the processor 31 may count up the number of uses included in evaluation information pertaining to the setting, or may recalculate the use frequency included in evaluation information pertaining to the setting. That is, every time a setting is used, the processor 31 may update the number of uses or use frequency included in evaluation information indicating an evaluation pertaining to the setting. When a use status is not detected in step S3 (NO in step S3), the processor 31 skips the process of step S4.

The processor 31 repeats the processes of steps S1-S4 until an end instruction is given (step S5).

The management system 30 that manages setting information of the observation system 10 detects the use status of a setting and updates evaluation information in accordance with the detected use status as indicated in FIG. 8, so that when providing setting information to a user at his/her request, pieces of setting information can be assigned priority levels by using the appropriately managed evaluation information, and provided to the user. Accordingly, the management system 30 allows the user of the observation system 10 to select an appropriate setting efficiently from a plurality of settings pertaining to the observation system 10 by referring to priority levels.

Figure 9:
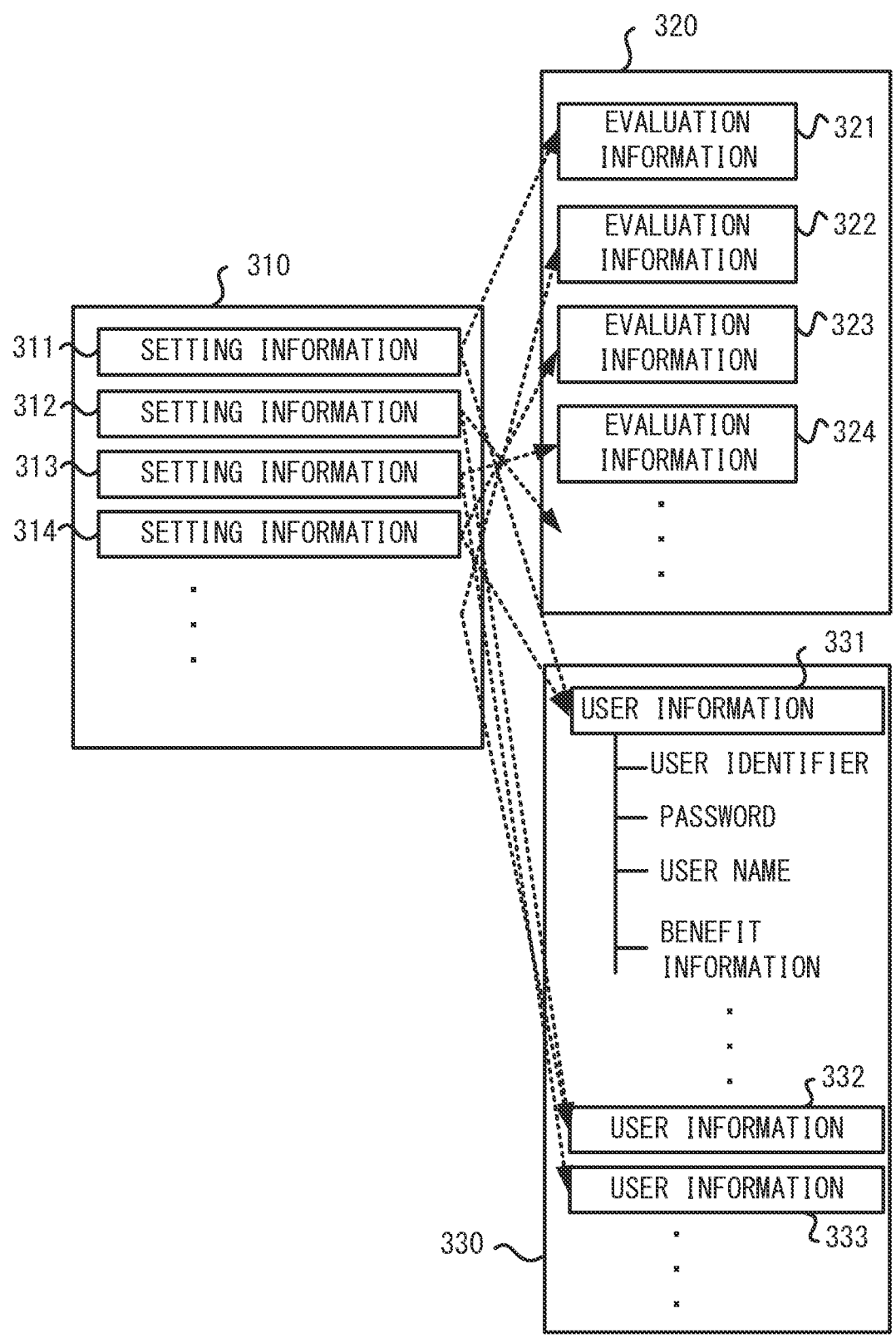
FIG. 9 is an explanatory diagram for a relationship between setting information 310, evaluation information 320, and user information 330.

FIG. 9 is an explanatory diagram for a relationship between setting information 310, evaluation information 320, and user information 330. While FIG. 7 depicts an example in which management information 32b includes setting information 310 and evaluation information 320, management information 32b may include, as depicted in FIG. 9, user information 330 in addition to setting information 310 and evaluation information 320. Thus, the management system 30 may manage user information 330 in addition to setting information 310 and evaluation information 320.

User information 330 includes information indicating a user of the observation system 10. User information 330 is a set of one or more pieces of different user information (user information 331, user information 332, user information 333). For example, as depicted in FIG. 9, each piece of user information may include the identifier of a user who uses the observation system 10, a password, a user name, and benefit information (described hereinafter).

Figure 10:
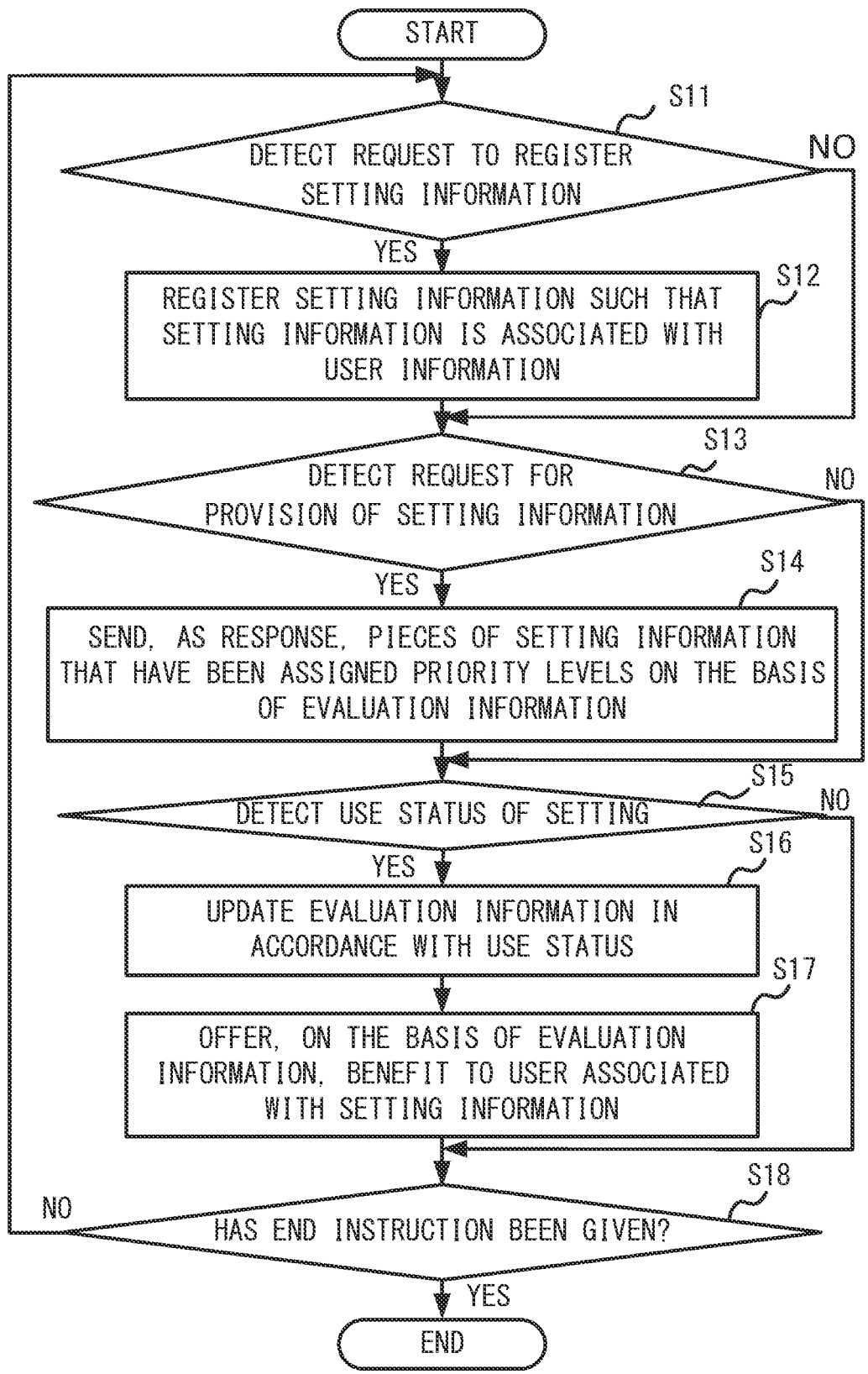
FIG. 10 is a flowchart illustrating another example of processes performed by a management system 30.

FIG. 10 is a flowchart illustrating another example of processes performed by the management system 30. By referring to FIG. 10, the following describes a method different from the method indicated in FIG. 8 wherein the management system 30 manages setting information and provides the setting information at a request from a user. As with the processes depicted in FIG. 8, the processes depicted in FIG. 10 are an example of the management method implemented by the management system 30 that manages setting information of the observation system 10, and may be performed by, for example, the processor 31 executing the program 32a.

Upon the processes depicted in FIG. 10 being started, the processor 31 of the management system 30 first monitors a request to register setting information of the observation system 10 (step S11). When detecting a request to register setting information from the user terminal 20 (YES in step S11), the processor 31 registers the setting information such that the setting information is associated with user information (step S12). In particular, on the basis of a request to register setting information from a user, the processor 31 registers the setting information such that the setting information is associated with user information indicating the user.

In step S12, for example, the processor 31 may acquire user information of the user who has made a request to register setting information, and then register the setting information for which the registration request has been made, such that the setting information is associated with the acquired user information. In the meantime, in a case where the management system 30 provides a mechanism for user authentication for use of the observation system 10, the management system 30 may use user information of a user authenticated by the management system 30 when the observation system 10 starts to be used. In a case where the observation system 10 has a mechanism for user authentication, the management system 30 may acquire user information from the observation system 10 through communication therewith. In a case where user authentication is not performed when the observation system 10 is used, when a user makes a request to register setting information, the management system 30 may make a request to input user information, and acquire the input user information. When a request to register setting information is not detected in step S11 (NO in step S11), the processor 31 skips the process of step S12.

Next, the processor 31 monitors a request for provision of setting information managed by the management system 30 (step S13). When detecting a request for provision of setting information from the user terminal 20 (YES in step S13), the processor 31 sends, as a response, pieces of setting information that have been assigned priority levels on the basis of evaluation information (step S14). In particular, upon a request for provision of setting information, the processor 31 sends, as a response, pieces of setting information that have been assigned priority levels on the basis of evaluation information. The processes of steps S13 and S14 are similar to those of steps S1 and S2 in FIG. 8.

In addition, the processor 31 monitors the use statuses of the settings of the observation system 10 (step S15). When detecting the use status of a setting (YES in step S15), the processor 31 updates the evaluation information in accordance with the use status (step S16). In particular, in accordance with the use status of the setting detected in step S15, the processor 31 updates evaluation information that is managed so as to be associated with the setting information of the setting and indicates an evaluation pertaining to the setting. The processes of steps S15 and S16 are similar to those of steps S3 and S4 in FIG. 8.

Upon the evaluation information being updated, the processor 31 offers, on the basis of the evaluation information, a benefit to a user indicated by user information associated with the setting information corresponding to the evaluation information (step S17).

In step S17, for example, the processor 31 may offer a new benefit to a user every time the number of uses included in evaluation information reaches a number determined in advance. Furthermore, for example, the processor 31 may offer a benefit to a user when the use frequency included in evaluation information is maintained at a predetermine level or higher for a certain period or longer. Details of benefits are not particularly limited, and the benefits may be, for example, authorization to use a fee-charging function of the observation system 10, augmentation of system resources of the observation system 10 allocated to the user, or offering of points that can be used on the observation system 10. Alternatively, the benefits may be discount of the charge for use of the observation system 10 or offering of some other monetary benefits (e.g., offering of virtual money). When a use status is not detected in step S15 (NO in step S15), the processor 31 skips the process of steps S16 and S17.

The processor 31 repeats the processes of steps S11-S17 until an end instruction is given (step S18).

The management system 30 that manages setting information of the observation system 10 can, as indicated in FIG. 10, register setting information such that the setting information is associated with user information, and offer a benefit to a user who has registered a highly evaluated setting, thereby encouraging users to register setting information of the observation system 10. Thus, sharing of setting information is promoted. Accordingly, in addition to assisting a user in selecting appropriate settings efficiently, the management system 30 allows the user to select settings to be used from among a larger amount of settings.

Figure 11:
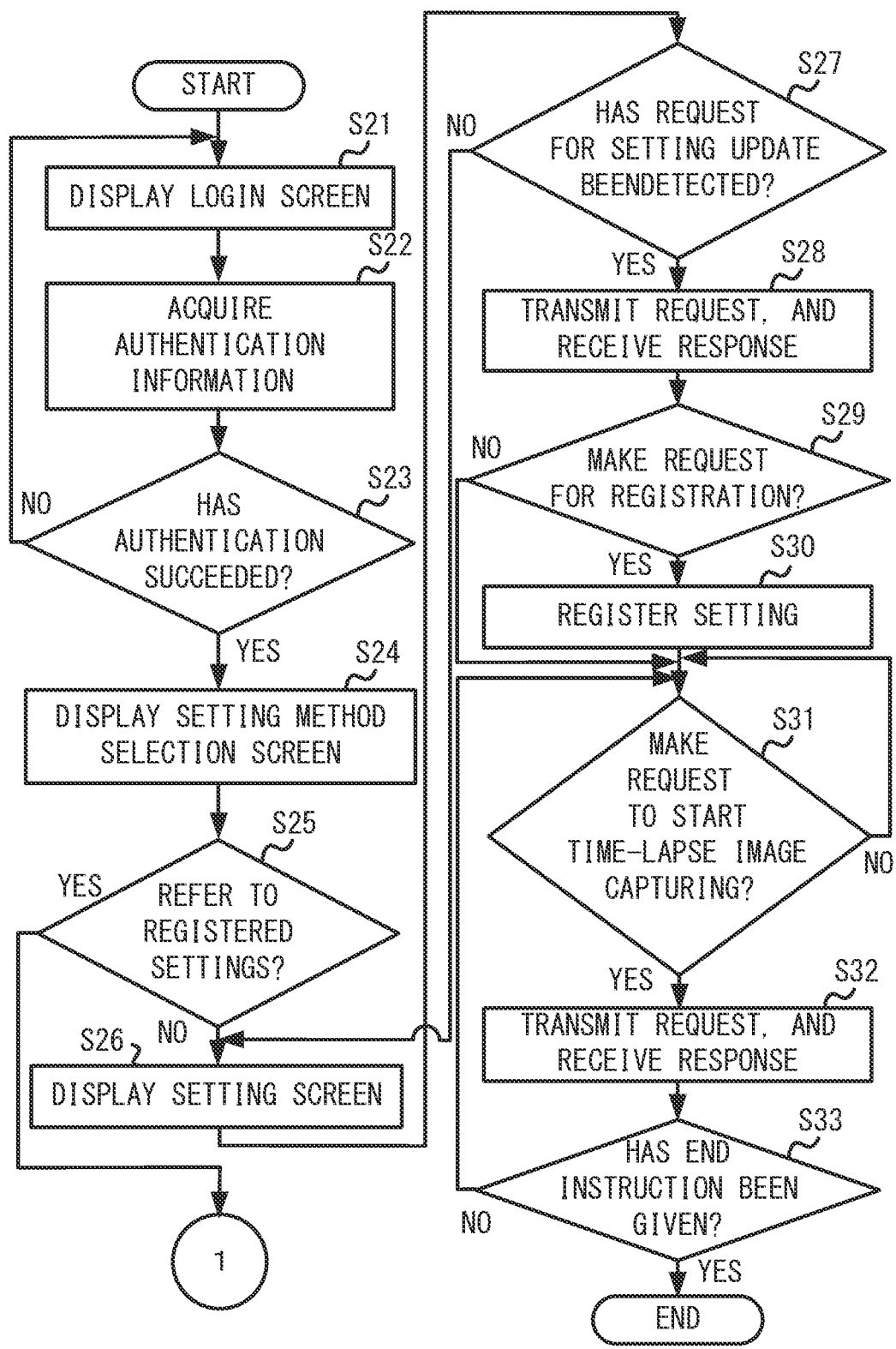
FIG. 11 is a flowchart illustrating still another example of processes performed by a management system 30.
Figure 12:
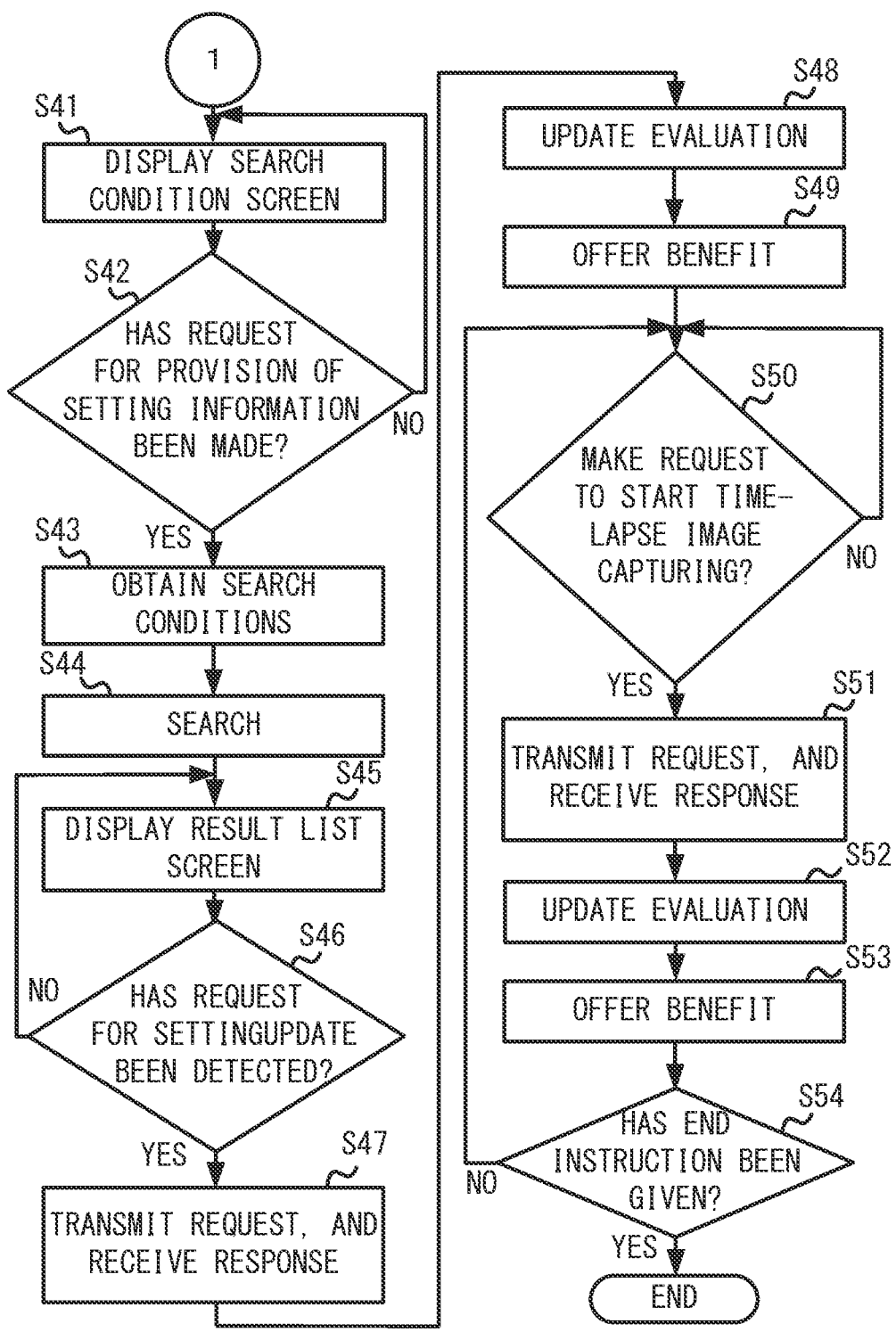
FIG. 12 is a flowchart illustrating yet another example of processes performed by a management system 30.
Figure 23:
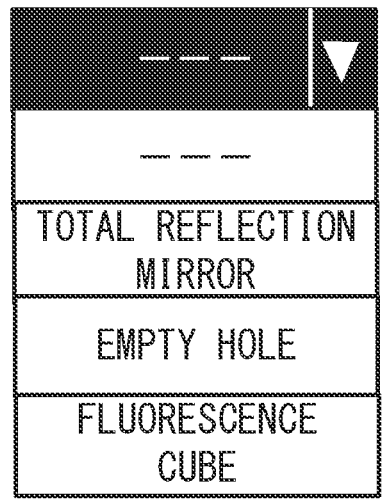
FIG. 23 illustrates another example of a search condition screen.
Figure 24:
FIG. 24 illustrates an example of a result list screen.

FIGS. 11 and 12 are flowcharts illustrating still other examples of processes performed by the management system 30. FIG. 13 illustrates an example of a login screen. FIG. 14 illustrates an example of a user information table. FIG. 15 illustrates an example of a setting method selection screen. FIG. 16 illustrates an example of a user/setting table. FIG. 17 illustrates an example of a setting information table. FIG. 18 illustrates an example of an apparatus-setting-information table. FIG. 19 illustrates an example of a cell information table. FIG. 20 illustrates an example of a container information table. FIG. 21 illustrates an example of an analytical process information table. FIGS. 22 and 23 exemplify a search condition screen. FIG. 24 illustrates an example of a result list screen. By referring to FIGS. 11-24, the following describes the management method implemented by the microscope system 30 more specifically.

Descriptions are given in the following for examples in which a user uses the observation system 10 via the management system 30 by using the user terminal 20. Thus, the management system 30 provides a mechanism for user authentication for use of the observation system 10, and the user terminal 20 accesses the observation system 10 via an application provided by the management system 30.

Upon the user terminal 20 accessing the management system 30, the processor 31 of the management system 30 provides a login screen to the user terminal 20, and the login screen is displayed (step S21). A screen 1 depicted in FIG. 13 is an example of the login screen provided by the management system 30. A user may select a system to be used and click a login button after inputting a user identifier and a password to the screen 1, thereby causing the user terminal 20 to transmit a request for user authentication to the management system 30. The following descriptions are based on an example in which a biological microscope system (observation system 12) is selected as a system to be used.

The processor 31 acquires authentication information (the user identifier and password) included in the request received from the user terminal 20 (step S22) and performs user authentication. In particular, the processor 31 refers to a user information table stored in the storage apparatus 32 so as to determine whether the authentication information acquired in step S22 is correct. Note that a table T1 depicted in FIG. 14 is an example of the user information table.

When the user authentication succeeds (YES in step S23), the processor 31 provides a setting method selection screen to the user terminal 20, and the setting method selection screen is displayed (step S24). A screen 2 depicted in FIG. 15 is an example of the setting method selection screen provided by the management system 30. When a user wishes to manually make settings from scratch for the observation system 12 to be used, the user may select "MAKE SETTINGS FROM SCRATCH" and click a "NEXT" button. When selecting to use settings registered in the management system 30, "REFER TO REGISTERED SETTINGS" may be selected, and then the "NEXT" button may be clicked.

When "MAKE SETTINGS FROM SCRATCH" is selected on the setting method selection screen (NO in step S25), the processor 31 provides a setting screen for the observation system 12 to the user terminal 20, and the setting screen is displayed (step S26). Then, the user selects, on the setting screen, setting details for various setting items for the observation system 12 and performs an updating operation, and in response to this, the processor 31 detects a request for setting update (YES in step S27).

The processor 31 transmits the request for setting update to the observation system 12 and receives a response therefrom (step S28). The observation system 12 updates, in accordance with the request for setting update from the management system 30, the settings of the observation system 12 by replacing setting items with the setting details selected by the user, and transmits a response for reporting update completion to the management system 30.

In addition, when the user performs, on the setting screen, an operation for registering the current settings of the observation system 12 in the management system 30, the processor 31 detects a request to register the settings (YES in step S29), and registers the current settings of the observation system 12 in the storage apparatus 32 (step S30).

In step S30, for example, the processor 31 may designate a setting ID and add a record consisting of a combination of the designated setting ID and the ID of the user who has logged in to a user/setting table of the storage apparatus 32. Note that a table T2 depicted in FIG. 16 is an example of the user/setting table.

In step S30, for example, the processor 31 may also designate an apparatus setting ID, a cell ID, a container ID, and an analytical process ID, and add a record including a setting ID as a main key to a setting information table of the storage apparatus 32, by using the designated IDs and an apparatus ID acquired from the observation system 12. Note that a table T3 depicted in FIG. 17 is an example of the setting information table. An experiment name and publication permissibility/impermissibility input to the setting screen by the user may be input to the experiment name field and the publication permissibility/impermissibility field of the record, and a date and time acquired from the system when the record was added may be input to the creation date field of the record. Nothing may be input as the average evaluation, and "0" may be input as the number of uses.

In step S30, the processor 31 adds details of the current settings of the observation system 12 to an apparatus-setting-information table of the storage apparatus 32 by using the designated apparatus setting ID. Note that a table T4 depicted in FIG. 18 is an example of the apparatus-setting-information table. Information acquired regarding the current settings from the observation system 12 maybe automatically input as items (setting items) and details (setting details) of records.

In step S30, the processor 31 adds details of a cell to be observed to a cell information table of the storage apparatus 32 by using the designated cell ID. Note that a table T5 depicted in FIG. 19 is an example of the cell information table. Items and details of records may be information input to the setting screen by the user.

In step S30, the processor 31 adds details of a container accommodating the object to be observed to a container information table of the storage apparatus 32 by using the designated container ID. Note that a table T6 depicted in FIG. 20 is an example of the container information table. Items and details of records may be information input to the setting screen by the user.

In step S30, the processor 31 adds details of an analytical process performed by the observation system 12 to an analytical process information table of the storage apparatus 32 by using the designated analytical process ID. Note that a table T7 depicted in FIG. 21 is an example of the analytical process information table. Aside from records that have a measurement result as an item, information acquired regarding the current settings of the analytical process performed by the observation system 12 may be automatically input as items and details of records. A record that has a measurement result as an item may be added, as appropriate, at a timing at which the analytical process is actually performed.

Afterward, when the user gives an instruction to start time-lapse image capturing, the processor 31 detects a request to start time-lapse image capturing (YES in step S31). The processor 31 transmits the request to start time-lapse image capturing to the observation system 12 and receives a response therefrom (step S32). The observation system 12 performs time-lapse image capturing in accordance with the request to start time-lapse image capturing from the management system 30 and transmits a response including images acquired through time-lapse image capturing and a measurement result to the management system 30.

Then, the processor 31 repeats the steps S31 and S32 until an end instruction is given (step S33).

When "REFER TO REGISTERED SETTINGS" is selected on the setting method selection screen (YES in step S25), the processor 31 provides a search condition screen to the user terminal 20, and the search condition screen is displayed (step S41). Screens 3 depicted in FIGS. 22 and 23 are examples of the search screen provided by the management system 30. When the user inputs search conditions and clicks a search button on the screen 3, the processor 31 detects a request for provision of setting information (step S42). The search conditions may include ones input through selection from conditions determined in advance (e.g., settings of the light-path switching turret depicted in FIG. 23) and ones obtained by freely inputting character strings (e.g. the free text field depicted in FIGS. and 23). Then, the processor 31 obtains the search conditions input to the screen 3 (step S43), and retrieves setting information meeting the search conditions from the tables T3-T7 of the storage apparatus 32 (step S44). In this case, the processor 31 assigns priority levels to pieces of setting information meeting the search conditions on the basis of evaluation information (e.g., the evaluation averages and the numbers of uses in the table T3).

Afterward, the processor 31 provides a result list screen to the user terminal 20, and the result list screen is displayed (step S45). A screen 4 depicted in FIG. 24 is an example of the result list screen provided by the management system 30. The result list screen displays, in accordance with priority levels, pieces of setting information meeting the search conditions obtained in step S43. More specifically, pieces of setting information may be displayed by being arranged in, for example, descending order of the number of uses. Note that the user can check details of setting information by clicking a "details" button.

When the user selects setting information on the result list screen and clicks a setting button, the processor 31 detects a request for setting update (YES in step S46). In addition, the processor 31 transmits, to the observation system 12, a request for setting update that follows the selected setting information, and receives a response from the observation system 12 (step S47). The observation system 12 changes the settings of thereof in accordance with the setting information included in the request for setting update that has been transmitted from the management system 30, so as to update the settings of the observation system 12. Then, the observation system 12 transmits a response for reporting update completion to the management system 30.

Next, the processor 31 updates evaluation information corresponding to the setting information selected in step S45 (step S48). In particular, for example, the processor 31 may specify a setting ID from the selected setting information and updates the table T3 by counting up the number of uses in the record that has the setting ID.

Furthermore, the processor 31 offers a benefit on the basis of the updated evaluation information (step S49). In this case, the processor 31 determines whether the updated number of uses satisfies a benefit offering condition. When the benefit offering condition is satisfied, the processor 31 offers a benefit to the user who registered the setting information for which the number of uses has been updated. More specifically, the processor 31 offers a benefit to the user by adding benefit information to a benefit field in the table T1.

Afterward, when the user gives an instruction to start time-lapse image capturing, the processor 31 detects a request to start time-lapse image capturing (YES in step S50). The processor 31 transmits the request to start time-lapse image capturing to the observation system 12 and receives a response therefrom (step S51). The observation system 12 performs time-lapse image capturing in accordance with the request to start time-lapse image capturing from the management system 30 and transmits a response including images acquired through time-lapse image capturing and a measurement result to the management system 30.

Upon receipt of the response from the observation system 12, the processor 31 updates evaluation information (step S52). In particular, for example, as in the process of step S48, the processor 31 may specify a setting ID from the selected setting information and update the table T3 by counting up the number of uses in the record that has the specified setting ID. More specifically, even in a case where the current setting of the observation system 12 is one obtained by changing a setting corresponding to the setting information selected in step S45 (hereinafter, "selected setting"), when the change satisfies a predetermined condition for the selected setting, the processor 31 updates evaluation information corresponding to the setting information selected in step S45. In this way, the evaluation information can also be updated through the substantial use of the selected setting, so the setting can be evaluated more correctly.

Furthermore, the processor 31 offers a benefit on the basis of the updated evaluation information (step S53). The process of step S53 is similar to that of step S49.

Then, the processor 31 repeats the steps S50-S53 until an end instruction is given (step S54).

By implementing either of the management methods depicted in FIGS. 11 and 12, the management system 30 can assist, like when implementing the management method depicted in FIG. 10, the user in selecting appropriate settings efficiently, while encouraging the user to register setting information of the observation system 10.

The embodiments described above indicate specific examples to facilitate understanding of the invention, and the present invention is not limited to these embodiments. Variations of the above-described embodiments and alternative embodiments therefor may fall within the scope of the present invention. Thus, components in each embodiment can be varied without departing from the gist and scope of the embodiment. A plurality of components disclosed with reference to one or more embodiments may be combined, as appropriate, to implement a new embodiment. Some of the components indicated with reference to each embodiment may be omitted, or some components may be added to the components indicated with reference to the embodiment. In addition, the order in which processing procedures indicated with reference to each embodiment are performed may be changed, as long as no contradictions arise. Accordingly, various modifications or changes can be made to the management system, the management method, and the computer-readable medium of the present invention without departing from the recitation in the claims.

For example, embodiments described above indicate examples in which the processor 31 determines that a setting has been used, i.e., detects a use status, (1) when a user has made a request for setting update for the observation system 10 on the basis of setting information selected from the result list screen and has received a response to the request from the observation system 10, or (2) when the user has made a request to perform time-lapse image capturing and has received response to the request from the observation system 10. However, the processor 31 may determine that a setting has been used, i.e., detect a use status, when a request to perform at least one of setting update, image acquisition, or image analysis has been transmitted to the observation system 10 and a response to the request has been received from the observation system 10. For example, it may be determined that a setting has been used when setting update is performed, and neither image acquisition nor image analysis may be determined as use of a setting. Alternatively, setting update may not be determined as use of a setting, and both image acquisition and image analysis may be determined as use of a setting. In this way, the reliability of evaluation information may be enhanced by flexibility changing the standard for updating evaluation information according to the situation.

Although the embodiments described above indicate examples in which evaluation information is updated in accordance with the use status of a setting without considering who the user of the setting is, evaluation information may be updated in consideration of the user of a setting. For example, every time a user other than a user who has made a request to register setting information uses a setting, the number of uses (or use frequency) included in evaluation information indicating an evaluation pertaining to the setting may be updated. In this way, use by a register person may be distinguished from use that can be a trigger to update evaluation information, so that use of settings can be evaluated more fairly. Hence, the reliability of priority levels determined for settings on the basis of evaluation information can be further enhanced.

The embodiments described above indicate examples in which even in a case where the setting of the observation system 10 is one obtained by changing a setting based on setting information selected by the user from the result list screen, when a predetermined condition is satisfied, use of the setting after the change is determined as use of the setting based on the setting information selected from the result list screen. However, the predetermined condition may be changed, as appropriate.

The embodiments described above indicates examples in which the setting of an analytical process is not dependent on another setting. However, for example, a setting determined in advance according to a sample may be used as the setting of an analytical process. For example, in the case of a sample constituted by iPS cells, a particular analytical process for iPS cells may be automatically set, and in the case of a sample constituted by adherent cells, a particular analytical process for adherent cells may be automatically set.

The embodiments described above exemplify the configurations of various tables with reference to examples pertaining to a biological microscope system. However, different table configurations may be used in accordance with the observation system 10. In the case of, for example, an industrial microscope system, the setting items in the analytical process information table may include analytical processes often used by industrial microscopes, such as width measurement, height measurement, volume measurement, cylinder measurement, roughness measurement, and particle analysis. The setting items in a sample information table may include features specifying a sample to be observed by an industrial microscope, such as a preparation temperature for the sample, a preparation humidity therefor, a heating time therefor, and the metal content thereof.

Figure 26:
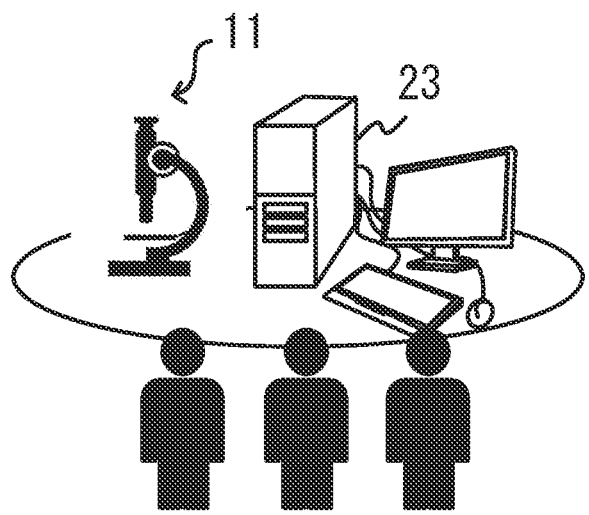
FIG. 26 illustrates the configuration of a system in accordance with still another embodiment.

The embodiments described above indicate examples in which the management system 30 manages setting information of a plurality of observation systems. However, as depicted in FIG. 25, the management system 30 may manage setting information of only one observation system (observation system 11). The embodiments described above indicate examples in which the observation system 10, the user terminal 20, and the management system 30 are separate systems (or apparatuses) connected over the network 40. However, these systems (or apparatuses) may be, as depicted in FIG. 26, a single system provided in a single location, and the control apparatus for the observation system 10, the user terminal 20, and the management system 30 may each also serve as another of these apparatuses or systems.

The expression "on the basis of A" herein does not mean "on the basis of only A" but means "on the basis of at least A," and may also mean "on the basis at least partially of A." Thus, the expression "on the basis of A" may mean that something may be based on B as well as A or that something may be based on a portion of A.

What is claimed is:

1. A management system for managing setting information of an observation system, the management system comprising:
one or more processors configured to:
detect a use status of a setting indicated by the setting information;
update, in accordance with the detected use status, evaluation information indicating an evaluation pertaining to the setting, the evaluation information being managed so as to be associated with the setting information;
detect a request for provision of the setting information managed by the management system;
upon detecting the request for provision of the setting information, assign priority levels to a plurality of pieces of setting information on the basis of the evaluation information; and
send a list of the setting information which has been assigned priority levels.

2. The management system of claim 1,
wherein the one or more processors are configured to:
on the basis of a request to register the setting information from a user indicated by user information of the observation system, register the setting information such that the setting information is associated with the user information; and,
on the basis of the evaluation information, offer a benefit to the user indicated by the user information associated with the setting information corresponding to the evaluation information.

3. The management system of claim 2,
wherein in updating the evaluation information, the one or more processors are configured to update, every time the setting is used, a number of uses or a use frequency that is included in the evaluation information.

4. The management system of claim 2,
wherein the one or more processors are configured to register, on the basis of a request to register the setting information from a user indicated by user information of the observation system, the setting information such that the setting information is associated with the user information, and
wherein, in updating the evaluation information, the one or more processors are configured to update, every time the setting indicated by the setting information is used by a user other than the user who has made the request to register the setting information, a number of uses or a use frequency that is included in the evaluation information.

5. The management system of claim 1,
wherein in updating the evaluation information, the one or more processors are configured to update, every time the setting is used, a number of uses or a use frequency that is included in the evaluation information.

6. The management system of claim 5,
wherein the use of the setting comprises use of the setting with a change satisfying a predetermined condition made thereto.

7. The management system of claim 1,
wherein the one or more processors are configured to register, on the basis of a request to register the setting information from a user indicated by user information of the observation system, the setting information such that the setting information is associated with the user information, and
wherein, in updating the evaluation information, the one or more processors are configured to update, every time the setting indicated by the setting information is used by a user other than the user who has made the request to register the setting information, a number of uses or a use frequency that is included in the evaluation information.

8. The management system of claim 7,
wherein the use of the setting comprises use of the setting with a change satisfying a predetermined condition made thereto.

9. The management system of claim 1,
wherein in detecting the use status of the setting, the one or more processors are configured to:
transmit a request to perform at least one of setting update, image acquisition, or image analysis to the observation system, and
receive a response to the request from the observation system.

10. The management system of claim 1,
wherein the setting information includes at least one of identification information of an image capturing apparatus included in the observation system, setting information of the image capturing apparatus, information on an object to be observed by the observation system, information on a container for accommodating the object to be observed, or setting information of an analytical process performed for an image acquired by the image capturing apparatus.

11. The management system of claim 1, further comprising:
a storage apparatus configured to store the setting information and the evaluation information such that the setting information and the evaluation information are associated with each other.

12. A management method implemented by a management system for managing setting information of an observation system, the management method comprising:
detecting a use status of a setting indicated by the setting information;
updating, in accordance with the detected use status, evaluation information indicating an evaluation pertaining to the setting, the evaluation information being managed so as to be associated with the setting information;
detecting a request for provision of the setting information managed by the management system;
upon detecting the request for provision of the setting information, assigning priority levels to a plurality of pieces of setting information on the basis of the evaluation information; and
sending a list of the setting information which has been assigned priority levels.

13. A non-transitory computer-readable medium having stored therein a program for causing a computer for a management system for managing setting information of an observation system to at least perform:
detecting a use status of a setting indicated by the setting information;
updating, in accordance with the detected use status, evaluation information indicating an evaluation pertaining to the setting, the evaluation information being managed so as to be associated with the setting information;
detecting a request for provision of the setting information managed by the management system;
upon detecting the request for provision of the setting information, assigning priority levels to a plurality of pieces of setting information on the basis of the evaluation information; and
sending a list of the setting information which has been assigned priority levels.

14. A management system for managing setting information of an observation system, the management system comprising:
one or more processors configured to:
detect a use status of a setting indicated by the setting information;
update, in accordance with the detected use status, evaluation information indicating an evaluation pertaining to the setting, the evaluation information being managed so as to be associated with the setting information;
on the basis of a request to register the setting information from a user indicated by user information of the observation system, register the setting information such that the setting information is associated with the user information; and
on the basis of the evaluation information, offer a benefit to the user indicated by the user information associated with the setting information corresponding to the evaluation information.

* * * * *